United States Patent
Arngren et al.

(10) Patent No.: US 12,232,068 B2
(45) Date of Patent: Feb. 18, 2025

(54) INFORMATION PROVISION ABOUT PEER COMMUNICATION DEVICES

(71) Applicant: Telefonaktiebolaget LM Ericsson (publ), Stockholm (SE)

(72) Inventors: Tommy Arngren, Södra Sunderbyn (SE); Min Wang, Luleå (SE); David Lindero, Luleå (SE); Jonas Pettersson, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 468 days.

(21) Appl. No.: 17/286,505

(22) PCT Filed: Oct. 19, 2018

(86) PCT No.: PCT/EP2018/078695
§ 371 (c)(1),
(2) Date: Apr. 19, 2021

(87) PCT Pub. No.: WO2020/078561
PCT Pub. Date: Apr. 23, 2020

(65) Prior Publication Data
US 2021/0360557 A1  Nov. 18, 2021

(51) Int. Cl.
*H04W 56/00* (2009.01)
*G01S 5/00* (2006.01)
(Continued)

(52) U.S. Cl.
CPC ............ *H04W 56/006* (2013.01); *G01S 5/00* (2013.01); *H04W 4/023* (2013.01); *H04W 4/029* (2018.02);
(Continued)

(58) Field of Classification Search
CPC ... H04W 56/006; H04W 4/023; H04W 4/029; H04W 4/80; H04W 4/90; H04W 64/00; G01S 5/00; G08G 1/161; G08G 1/02
See application file for complete search history.

(56) References Cited

U.S. PATENT DOCUMENTS 8,880,585 B1  11/2014  Pope et al.
9,820,255 B1 * 11/2017  Demsey ............... H04W 4/021
(Continued)

FOREIGN PATENT DOCUMENTS

JP  2001268127 A  *  9/2001  ............. H04L 45/04

OTHER PUBLICATIONS

International Search Report and the Written Opinion of the International Searching Authority, issued in corresponding International Application No. PCT/EP2018/078695, dated Jul. 25, 2019, 9 pages.
(Continued)

*Primary Examiner* — Umair Ahsan
(74) *Attorney, Agent, or Firm* — Rothwell, Figg, Ernst & Manbeck, P.C.

(57) ABSTRACT

There is provided mechanisms for providing information about peer communication devices to a network node. A method is performed by a first peer communication device. The method comprises exchanging, with a second peer communication device over a device-to-device connection, any timestamped identity information and location information about other peer communication devices as previously exchanged with at least one peer communication dev ice other than the second peer communication dev ice. The method comprises adding to the timestamped identity information and location information, timestamped identity information and location information about the second peer communication device as obtained from the second peer communication dev ice. The method comprises forwarding (Continued)

the timestamped identity information and location information to a network node upon network access to the network node.

26 Claims, 6 Drawing Sheets

(51) Int. Cl.
*H04W 4/02* (2018.01)
*H04W 4/029* (2018.01)
*H04W 4/80* (2018.01)
*H04W 4/90* (2018.01)
*H04W 64/00* (2009.01)

(52) U.S. Cl.
CPC ............... *H04W 4/80* (2018.02); *H04W 4/90* (2018.02); *H04W 64/00* (2013.01)

(56) References Cited

U.S. PATENT DOCUMENTS

| | | | | |
|---|---|---|---|---|
| 2011/0131197 | A1* | 6/2011 | Nielsen | H04L 67/5682 |
| | | | | 706/47 |
| 2012/0117209 | A1 | 5/2012 | Sinha | |
| 2012/0129607 | A1* | 5/2012 | Jabara | A63F 13/332 |
| | | | | 463/41 |
| 2015/0356328 | A1* | 12/2015 | Wassingbo | H04W 4/80 |
| | | | | 340/10.1 |
| 2016/0337808 | A1* | 11/2016 | Narasimha | H04W 24/08 |
| 2018/0295517 | A1* | 10/2018 | Bicket | H04L 63/0823 |
| 2019/0012385 | A1* | 1/2019 | Slepichko | H04L 67/06 |

OTHER PUBLICATIONS

AT&T Foundry et al. "The Future of Drones According to the AT&T Foundry" dated Oct. 6, 2016, 52 pages.

* cited by examiner

INFORMATION PROVISION ABOUT PEER COMMUNICATION DEVICES

CROSS REFERENCE TO RELATED APPLICATION(S)

This application is a 35 U.S.C. § 371 National Phase Entry Application from PCT/EP2018/078695, filed Oct. 19, 2018, designating the United States, the disclosure of which is incorporated herein by reference in its entirety.

TECHNICAL FIELD

Embodiments presented herein relate to a method, a peer communication device, a computer program, and a computer program product for providing information about peer communication devices to a network node. Embodiments presented herein further relate to a method, a network node, a computer program, and a computer program product for obtaining information about peer communication devices.

BACKGROUND

In communications networks, there may be a challenge to obtain good performance and capacity for a given communications protocol, its parameters and the physical environment in which the communications network is deployed.

For example, it could in some situations be advantageous to track the location of communication devices in the communication network. Some existing mechanisms for tracking the location of communication devices are based on information collected by the network, such as from radio access network nodes providing network access to the communication devices. Other existing mechanisms are based on the use of external purpose built tracking equipment that is collocated with, or paired with, the communication devices. For example, the tracking equipment could communicate with the communication device it is collocated with using the Bluetooth technology. Other communication devices also using such external purpose built tracking equipment could then report if detecting a Bluetooth signal from such a communication device that has been reported missing.

So-called delay-tolerant networking (DTN) or disruption-tolerant networking is an approach to computer network architecture that seeks to address the technical issues in heterogeneous networks that may lack continuous network connectivity. Disruption may occur because of the limits of wireless radio range, sparsity of mobile nodes, energy resources, attack, and noise. DTN is an alternative to make broadband communication available in areas that e.g. lack network coverage.

Scenarios with lacking continuous network connectivity might make it difficult to, using the mechanisms disclosed above, track the location of communication devices.

Hence, there is still a need for improved mechanisms for tracking the location of communication devices.

SUMMARY

An object of embodiments herein is to enable efficient tracking the location of communication devices.

This object is achieved by the methods, peer communication devices, and network nodes disclosed herein.

According to a first aspect there is presented a method for providing information about peer communication devices to a network node. The method is performed by a first peer communication device. The method comprises exchanging, with a second peer communication device over a device-to-device connection, any timestamped identity information and location information about other peer communication devices as previously exchanged with at least one peer communication device other than the second peer communication device. The method comprises adding to the timestamped identity information and location information, timestamped identity information and location information about the second peer communication device as obtained from the second peer communication device. The method comprises forwarding the timestamped identity information and location information to a network node upon network access to the network node.

According to a second aspect there is presented a peer communication device for providing information about peer communication devices to a network node. The peer communication device comprises processing circuitry (210). The processing circuitry is configured to cause the peer communication device to exchange, with a second peer communication device over a device-to-device connection, any timestamped identity information and location information about other peer communication devices as previously exchanged with at least one peer communication device other than the second peer communication device. The processing circuitry is configured to cause the peer communication device to add to the timestamped identity information and location information, timestamped identity information and location information about the second peer communication device as obtained from the second peer communication device. The processing circuitry is configured to cause the peer communication device to forward the timestamped identity information and location information to a network node upon network access to the network node.

According to a third aspect there is presented a peer communication device for providing information about peer communication devices to a network node. The peer communication device comprises an exchange module configured to exchange, with a second peer communication device over a device-to-device connection, any timestamped identity information and location information about other peer communication devices as previously exchanged with at least one peer communication device other than the second peer communication device. The peer communication device comprises an add module configured to add to the timestamped identity information and location information, timestamped identity information and location information about the second peer communication device as obtained from the second peer communication device. The peer communication device comprises a forward module configured to forward the timestamped identity information and location information to a network node upon network access to the network node.

According to a fourth aspect there is presented a computer program for providing information about peer communication devices to a network node. The computer program comprises computer program code which, when run on processing circuitry of a peer communication device, causes the peer communication device to perform a method according to the first aspect.

According to a fifth aspect there is presented a method for obtaining information about peer communication devices. The method is performed by a network node. The method comprises obtaining, from one of the peer communication devices, timestamped identity information and location information about peer communication devices of said one of the peer communication devices.

According to a sixth aspect there is presented a network node for obtaining information about peer communication devices. The network node comprises processing circuitry. The processing circuitry is configured to cause the network node to obtain, from one of the peer communication devices, timestamped identity information and location information about peer communication devices of said one of the peer communication devices.

According to a seventh aspect there is presented a network node for obtaining information about peer communication devices. The network node comprises an obtain module configured to obtain, from one of the peer communication devices, timestamped identity information and location information about peer communication devices of said one of the peer communication devices.

According to an eight aspect there is presented a computer program for obtaining information about peer communication devices, the computer program comprising computer program code which, when run on processing circuitry of a network node, causes the network node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these peer communication devices, these network nodes, and these computer programs enable the location of the reported peer communication devices to be tracked.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
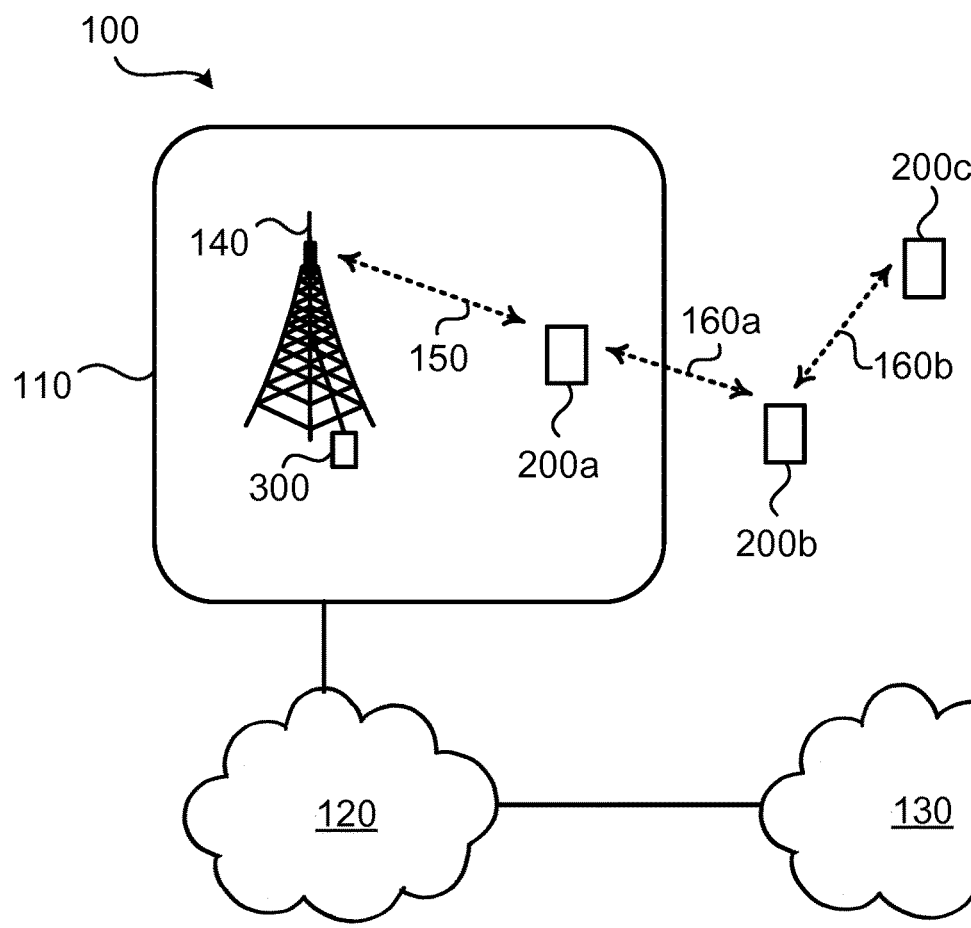
FIG. 1 is a schematic diagram illustrating a communication network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network node 300 configured to, via a transmission and reception point 140, provide network access to at least one communication device 200a in a radio access network 110, thus enabling the communication device 200a to communicate over a wireless link 150. The radio access network 110 is operatively connected to a core network 120. The core network 120 is in turn operatively connected to a service network 130, such as the Internet. The communication device 200a is thereby enabled to, via the network node 300, access services of, and exchange data with, the service network 130. Further, by means of a device-to-device connection 160a the communication device 200a is enabled to communicate with another communication device 200b. The communication device 200b could be located within as well as outside the radio access network 110 when the device-to-device connection 160a is established. The communication device 200b is in turn enabled to, by means of another device-to-device connection 160b, communicate with yet another communication device 200c located outside the radio access network 110. The information exchanged between the communication devices 200a, 200b, 200c via the device-to-device connections 160a, 160b can be provided to the network node 300 whenever one of the communication devices 200a, 200b, 200c is within radio access of 110, as in FIG. 1 exemplified by communication device 200a being within the radio access network 110. Further, although in the illustrative example of FIG. 1 a first device-to-device connection 160a is illustrated as established between communication device 200a and communication device 200b, and a second device-to-device connection 160b is illustrated as established between communication device 200b and communication device 200c, these two device-to-device connections 160a, 160b are not necessarily established at the same point of time. Typically, a device-to-device connection 160a, 160b could be established any time the two communication devices 200a, 200b, 200c at either end of the device-to-device connection 160a, 160b are within the range of each other with respect to the communication technology used for establishing, and maintaining, the device-to-device connection 160a, 160b. Examples of such technologies will be given below. Thus, a given communication device 200a, 200b, 200c might typically establish one device-to-device connection 160a, 160b in a sequential manner when moving from one location to another and when doing so encountering another communication device 200a, 200b, 200c. Further, this does not exclude that further device-to-device connections could be established, within as well as outside the radio access network 110. The same holds for the wireless link 150 established between communication device 200a and the network node 300 via the transmission and reception point 140; also other wireless links could be established between the network node 300 and any communication device located within, and served by, the radio access network 110.

Examples of network nodes 300 are radio access network nodes, radio base stations, base transceiver stations, Node Bs, evolved Node Bs, g Node Bs, access points, and access nodes, and backhaul nodes. Examples of communication devices 200a, 200b, 200c are wireless devices, mobile stations, mobile phones, handsets, wireless local loop phones, user equipment (UE), smartphones, laptop computers, tablet computers, network equipped sensors, network equipped vehicles (such as cars, ships, helicopters, aeroplanes, unmanned aerial vehicles, etc.), and so-called Internet of Things (IoT) devices. In this respect, the communication devices 200a, 200b, 200c (for example when being provided as IoT devices) could be provided in a garment (such as a sweater, jacket, hat, shoe, sock, shoe, glove, etc.), or protective equipment (such as a helmet), other equipment (such as a ski, skate, snowboard, bicycle, etc.). The communication devices 200a, 200b, 200c will herein after be collectively referred to as peer communication devices 200a, 200b, 200c.

In general terms, the peer communication devices 200a, 200b, 200c are configured to, upon encountering another peer communication device 200a, 200b, 200c, exchange location information with each other in order to allow to provide for later tracking of the peer communication devices 200a, 200b, 200c when not being within network coverage, and reporting of the exchanged information when being within network coverage.

The embodiments disclosed herein thus relate to mechanisms for providing information about peer communication devices 200a, 200b, 200c to the network node 300. The embodiments disclosed herein further relate to mechanisms for the network node 300 to obtain information about the peer communication devices 200a, 200b, 200c. In order to obtain such mechanisms there is provided a peer communication device 200a, 200b, 200c, a method performed by the peer communication device 200a, 200b, 200c, a computer program product comprising code, for example in the form of a computer program, that when run on processing circuitry of the peer communication device 200a, 200b, 200c, causes the peer communication device 200a, 200b, 200c to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2:
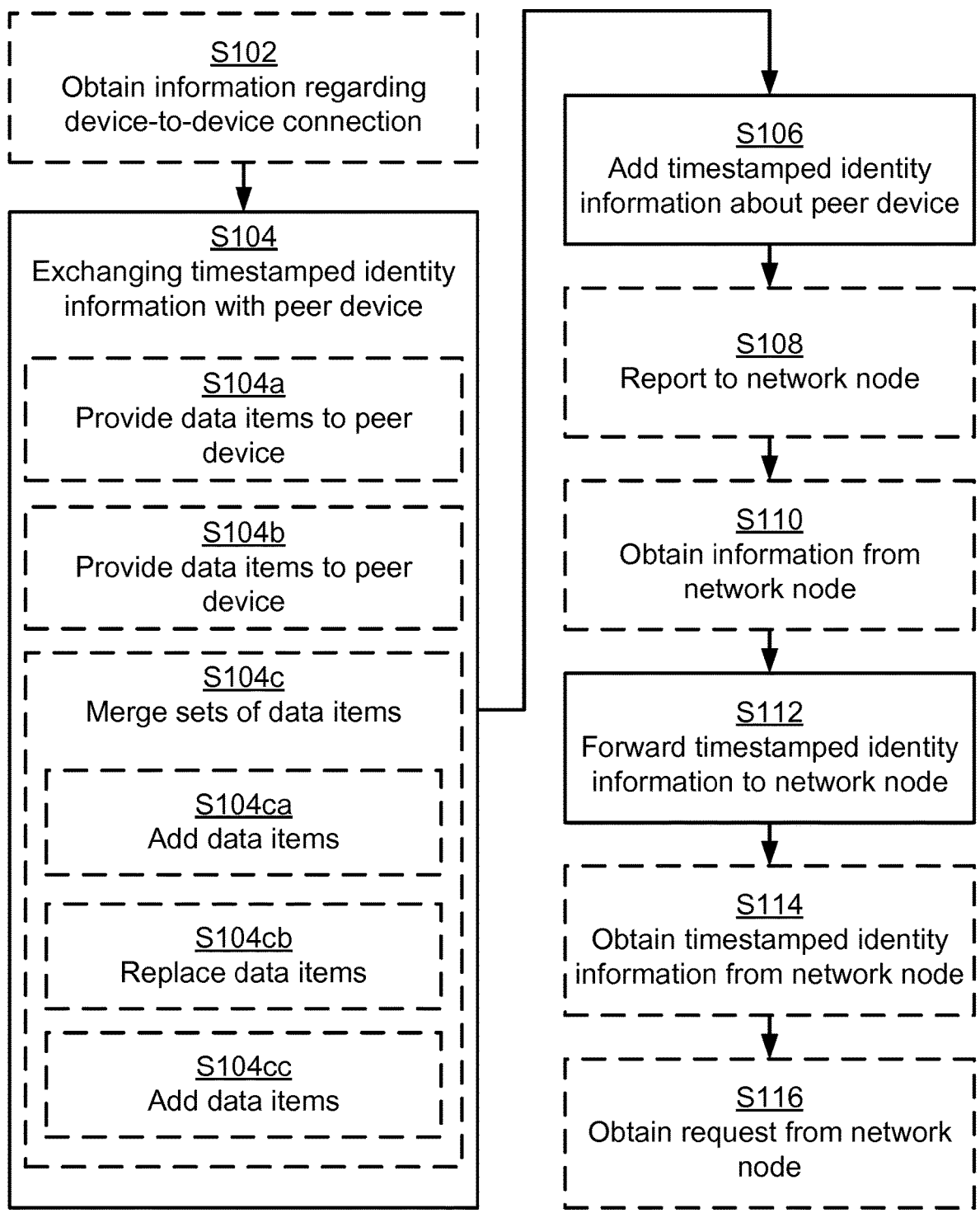
FIGS. 2 and 3 are flowcharts of methods according to embodiments.

Reference is now made to FIG. 2 illustrating a method for providing information about peer communication devices 200a, 200b, 200c to a network node 300 as performed by a peer communication device 200a, 200b, 200c hereinafter denoted a first peer communication device 200a, 200b, 200c according to an embodiment.

The first peer communication device 200a, 200b, 200c exchanges timestamped identity information and location information with a second peer communication device 200a, 200b, 200c. Particularly, the first peer communication device 200a, 200b, 200c is configured to perform step S104:

S104: The first peer communication device 200a, 200b, 200c exchanges, with a second peer communication device 200a, 200b, 200c over a device-to-device connection 160a, 160b, any timestamped identity information and location information about other peer communication devices 200a, 200b, 200c as previously exchanged with at least one peer communication device other than the second peer communication device 200a, 200b, 200c.

The first peer communication device 200a, 200b, 200c also obtains timestamped identity information and location information about the second peer communication device 200a, 200b, 200c itself. Hence, the first peer communication device 200a, 200b, 200c is configured to perform step S106:

S106: The first peer communication device 200a, 200b, 200c adds to the timestamped identity information and location information, timestamped identity information and location information about the second peer communication device 200a, 200b, 200c as obtained from the second peer communication device 200a, 200b, 200c.

The timestamped identity information and location information is provided to the network node 300. Hence, the first peer communication device 200a, 200b, 200c is configured to perform step S112:

S112: The first peer communication device 200a, 200b, 200c forwards the timestamped identity information and location information to a network node 300 upon network access 150 to the network node 300.

This method allows peer communication devices 200a, 200b, 200c that do not have network connectivity, but which are enabled to establish device-to-device connections to other peer communication devices 200a, 200b, 200c, to exchange timestamped data between each other (although it is not excluded that the timestamped data can be exchanged over device-to-device connections when at least one of the peer communication devices 200a, 200b, 200c taking part in the exchange of timestamped data is within the radio access network 110 and thus has network connectivity). When any peer communication device 200a, 200b, 200c do get network connectivity, the thus exchanged timestamped data can be provided to the network node 300. As will be further disclosed below, the exchanged timestamped data can be used, so that, when one of the peer communication devices 200a, 200b, 200c is considered to be lost, its movement can be tracked, based on the exchanged timestamped data as available at the network node 300.

Embodiments relating to further details of providing information about peer communication devices 200a, 200b, 200c to a network node 300 as performed by the first peer communication device 200a, 200b, 200c will now be disclosed.

In general terms, the communication between peer communication devices 200a, 200b, 200c in the vicinity of each other can be exemplified by packets by means of which the timestamped identity information and location information is exchanged. The same applies for the communication between peer communication devices 200a, 200b, 200c and the network node 300.

There could be different types of device-to-device connections 160a, 160b. In some examples the device-to-device connection 160a, 160b is a wireless connection. Wireless connections could, for example, be established using communication over a Bluetooth connection, using infrared (IR) communication according to the Infrared Data Association (IrDA), or using a Near-field communication (NFC) protocol.

In some aspects the data forwarded to the network node 300 is tagged with identity information of the peer communication device 200a, 200b, 200c that forwards the data. Particularly, according to an embodiment the timestamped identity information and location information forwarded to the network node 300 is tagged with an identifier of the first peer communication device 200a, 200b, 200c. The network node 300 could then use the identifier for tracking all data received from one and the same peer communication device 200a, 200b, 200c. That is, the network node 300 is by means of the identifier enabled to track what timestamped data has been received from which peer communication device 200a, 200b, 200c.

There could be different scenarios and network conditions under which the data is exchanged between the peer communication devices 200a, 200b, 200c. In some aspects the data is exchanged only when the peer communication devices 200a, 200b, 200c are outside network coverage. One reason is that otherwise the network node 300 might itself has direct access to timestamped identity information and location information of its served communication devices. Particularly, according to an embodiment the timestamped identity information and location information is exchanged with the second peer communication device 200a, 200b, 200c only when the first peer communication device 200a, 200b, 200c is without network access 150 to any network node 300. However, in other aspects the data is exchanged also when the peer communication devices 200a, 200b, 200c are within network coverage. One reason for this could be to enable continues tracking of the peer communication devices 200a, 200b, 200c (i.e., within as well as outside network coverage). Another reason for this could be that only one of the peer communication devices 200a, 200b, 200c is to provide the exchanged timestamped data to the network node 300 and thus coordination of timestamped data is needed between the peer communication devices 200a, 200b, 200c.

There could be different triggers for the peer communication device 200a, 200b, 200c to communicate over the device-to-device connection 160a, 160b. According to an embodiment the first peer communication device 200a, 200b, 200c is configured to perform (optional) step S102:

S102: The first peer communication device 200a, 200b, 200c obtains information pertaining to at least one of when, how often, and at what location, the first peer communication device 200a, 200b, 200c is to enable establishment of the device-to-device connection 160a, 160b.

In some aspects the peer communication devices 200a, 200b, 200c thus receives instructions to scan (or scan more often) for other peer communication devices 200a, 200b, 200c when located at a certain location, or to scan for other peer communication devices 200a, 200b, 200c periodically. The information in step S102 might be obtained either from sensor input, from user input, from the network node 300, or from another peer communication device 200a, 200b, 200c.

The device-to-device connection 160a, 160b might be established based on user input where a user of the peer communication device 200a, 200b, 200c initiates data exchange using a graphical user interface of the peer communication device 200a, 200b, 200c.

The device-to-device connection 160a, 160b might be established based on system information as provided to the peer communication device 200a, 200b, 200c. The system information might relate to where and how soon encounters with other peer communication devices 200a, 200b, 200c may occur depending on the geographical route of the peer communication device 200a, 200b, 200c and based on history data.

As an example, the system information might relate to a certain geographical area (terrain, vegetation, network access, known paths/routes, etc.) in which the device-to-device connection 160a, 160b should be established. As an example, the system information might relate to an estimated number of peer communication devices 200a, 200b, 200c in this certain geographical area. As an example, the system information might relate to locations or parts of certain geographical area with network access. This will enable the peer communication device 200a, 200b, 200c to schedule when to establish the device-to-device connection 160a, 160b for data exchange with another peer communication device 200a, 200b, 200c.

The device-to-device connection 160a, 160b might be established based on an input signal, such as a triggering signal, from an accelerometer, a temperature sensor, or a global (or local) positioning system, etc.

The device-to-device connection 160a, 160b might be established periodically, might use a certain carrier frequency, and/or might broadcast a probing message within a limited range. Such a probing message might comprise a request for data exchange related to actual location.

Hence, based on any of the above the peer communication device 200a, 200b, 200c could determines whether to establish the device-to-device connection 160a, 160b for data exchange with another peer communication device 200a, 200b, 200c.

As an illustrative example, when to scan and exchange data with other peer communication device 200a, 200b, 200c might be performed according to values of a parameter UE_exchange, where the parameter UE_exchange is given as UE_exchange=intervals (seconds, minutes, hours or distance or height) and/or location.

As mentioned above, the timestamped identity information and location information might be exchanged by means of packets. Further, in some aspects the timestamped identity information and location information is represented by data items. Particularly, according to an embodiment, the timestamped identity information and location information is represented by a set of data items, where each data item is provided with a timestamp and comprises location information as valid for the timestamp and a device identity of a respective peer communication device 200a, 200b, 200c.

As an illustrative example, each data item might take the form [reporting UE_id, data]. Here, reporting UE_id is the identity of the peer communication device 200a, 200b, 200c reporting the data items, and the data includes a table with observed UE_id:s, observation locations, observation timestamps. Assume that peer communication device UE_id_1 has gather timestamped location information about peer communication devices UE_id_22, UE_id_5, UE_id_67, and UE_id_10. The data items exchanged by peer communication device UE_id_1 might thus then take the following form:

Reporting UE_id: UE_id_1
Data: [Timestamp_t1, UE_id_22, Location x1, y1, z1,
Timestamp_t2, UE_id_5, Location x2, y2, z2,
Timestamp_t3, UE_id_67, Location x3, y3, z3,
Timestamp_t4, UE_id_10, Location x4, y4, z4]

Here, Timestamp_t1 is the timestamp for peer communication device UE_id_22 and Location x1, y1, z1 is the location information for peer communication device UE_id_22, etc.

According to an embodiment, the adding in step S106 comprises adding, to the updated set of data items, a data item for the second peer communication device 200a, 200b, 200c. This data item is provided with a timestamp and comprising location information as valid for the timestamp and a device identity of the second peer communication device 200a, 200b, 200c.

In some aspects more data than timestamped identity information and location information is exchanged between the peer communication devices 200a, 200b, 200c.

In some examples each data item further comprises at least one of: current remaining power for the respective other peer communication device 200a, 200b, 200c as valid for the timestamp, and sensor data collected by the respective other peer communication device 200a, 200b, 200c.

In some examples each data item further comprises a mode value, where the mode vale indicates a present mode of the respective peer communication device 200a, 200b, 200c as valid for the timestamp. There could be different such mode values. Non-limiting examples are normal mode, alert mode, and emergency mode.

For example, the alert mode could indicate that the peer communication device 200a, 200b, 200c needs to provide an alert message to the network node 300 together with the collected, timestamped data. For example, the emergency mode could indicate that the user of the peer communication device 200a, 200b, 200c is in an emergency situation and requires the attention of an emergency service or rescue service. In this respect, both the network node 300 and the peer communication devices 200a, 200b, 200c themselves might determine which mode should be set for a particular peer communication device 200a, 200b, 200c. The mode value could be represented by a flag value as set in the data item.

In some aspects the first peer communication device 200a, 200b, 200c prior to exchanging the timestamped identity information and location information in step S104 has access to a first initial set of the data items. In some aspects the second peer communication device 200a, 200b, 200c prior to exchanging the timestamped identity information and location information has access to a second initial set of the data items.

There could be different ways in which the initial sets of the data items are processed during, or affected by, the exchange in step S104 and the forwarding in step S112.

In some aspects the data items are removed from the first peer communication device 200a, 200b, 200c upon having been forwarded to the network node 300. Particularly, according to an embodiment the data items are deleted from the first peer communication device 200a, 200b, 200c upon having received an indication from the network node 300 to do so. In other aspects the first peer communication device 200a, 200b, 200c sets a flag that indicates whether a data item has been forwarded to the network node 300 or not. This indication might be of value the next time timestamped identity information and location information is exchanged between the first peer communication device 200a, 200b, 200c and another peer communication device 200a, 200b, 200c. For example, the peer communication device 200a, 200b, 200c receiving such an indication will then understand that this data has already been forwarded to the network node 300.

In some aspects the first peer communication device 200a, 200b, 200c access to an updated set of data items after the exchange in step S104. Particularly, according to an embodiment the exchanging in step S104 results in the first peer communication device 200a, 200b, 200c having access to an updated set of data items of which at least some data items are forwarded to the network node 300.

There could be different ways in which the timestamped identity information and location information about other peer communication devices 200a, 200b, 200c is exchanged between the first peer communication device 200a, 200b, 200c and the second peer communication device 200a, 200b, 200c in step S104. In general terms, the exchanged data between first peer communication device 200a, 200b, 200c and the second peer communication device 200a, 200b, 200c is added to each of the first peer communication device 200a, 200b, 200c and the second peer communication device 200a, 200b, 200c. Redundant and/or obsolete data might be identified and removed.

In some aspects exchanging the timestamped identity information involves the first peer communication device 200a, 200b, 200c to transmit its own data.

According to some examples only those data items with newer timestamps than the corresponding data items in the second initial set of data items are transmitted. Particularly, according to an embodiment the first peer communication device 200a, 200b, 200c is configured to perform (optional) step S104a as part of step S104:

S104a: The first peer communication device 200a, 200b, 200c provides, to the second peer communication device 200a, 200b, 200c, data items in the first initial set of data items for which the timestamps are newer than the timestamps of the data items in the second initial set of data items for same respective peer communication device 200a, 200b, 200c.

According to some examples only those data items not represented in the second initial set of data items are transmitted. Particularly, according to an embodiment the first peer communication device 200a, 200b, 200c is configured to perform (optional) step S104b as part of step S104:

S104b: The first peer communication device 200a, 200b, 200c provides, to the second peer communication device 200a, 200b, 200c, data items from the first initial set of data items for those respective peer communication devices 200a, 200b, 200c not represented in the second initial set of data items.

According to some examples the first initial set of data items is merged with the second initial set of data items. Particularly, according to an embodiment the first peer communication device 200a, 200b, 200c is configured to perform (optional) step S104c as part of step S104:

S104c: The first peer communication device 200a, 200b, 200c merges the first initial set of data items with the second initial set of data items.

There could be different ways for the first peer communication device 200a, 200b, 200c to merge the first initial set of data items with the second initial set of data items as in step S104c.

According to a first example the merging involves the first peer communication device 200a, 200b, 200c to add received data to its own data. Particularly, according to an embodiment the first peer communication device 200a, 200b, 200c is configured to perform (optional) step S104ca as part of step S104a:

S104ca: The first peer communication device 200a, 200b, 200c adds to the first initial set of data items, data items from the second initial set of data items for those respective peer communication devices 200a, 200b, 200c not represented in the first initial set of data items.

According to a first example the merging involves the first peer communication device 200a, 200b, 200c to remove redundant own data. Particularly, according to an embodiment the first peer communication device 200a, 200b, 200c is configured to perform (optional) step S104cb as part of step S104:

S104cb: The first peer communication device 200a, 200b, 200c replaces those data items in the first initial set of data items for which the data items in the second initial set of data items have newer timestamps for same respective peer communication devices 200a, 200b, 200c.

According to a first example the merging involves the first peer communication device 200a, 200b, 200c to keep all data. Particularly, according to an embodiment the first peer communication device 200a, 200b, 200c is configured to perform (optional) step S104cc as part of step S104c:

S104cc: The first peer communication device 200a, 200b, 200c adds to the first initial set of data items, all data items from the second initial set of data items.

There could be different ways for the first peer communication device 200a, 200b, 200c to forward the timestamped identity information and location information to the network node 300 as in step S112.

In some aspects the first peer communication device 200a, 200b, 200c forwards less than all its exchanged data to the network node 300. In order to do so the first peer communication device 200a, 200b, 200c might receive information from the network node 300 regarding data that has already been obtained by the network node 300 from other peer communication devices 200a, 200b, 200c. Particularly, according to an embodiment the first peer communication device 200a, 200b, 200c is configured to perform (optional) step S110:

S110: The first peer communication device 200a, 200b, 200c obtains information from the network node 300 pertaining to a set of device identities and respective timestamps already provided to the network node 300.

Based on this information the first peer communication device 200a, 200b, 200c might select what data to forward to the network node 300. According to an embodiment only those data items of the updated set of data items comprising the device identities in the set of device identities and timestamps newer that the respective timestamps indicated by the network node 300 are forwarded to the network node 300.

In some aspects the first peer communication device 200a, 200b, 200c first provides only the device identities and respective timestamps to the network node 300. Particularly, according to an embodiment the first peer communication device 200a, 200b, 200c is configured to perform (optional) step S108:

S108: The first peer communication device 200a, 200b, 200c reports, to the network node 300 and prior to obtaining said information from the network node 300, device identity and newest timestamp for each respective other peer communication device 200a, 200b, 200c in the updated set of data items.

In this respect, the network node 300 could be configured to dynamically determine how to limit the amount of data to be exchanged between the peer communication devices 200a, 200b, 200c and the network node 300, as well as between the peer communication devices 200a, 200b, 200c themselves.

The network node 300 might then use the reporting to determine for which device identities the network node 300 already has obtained the recent most location information and thus inform the first peer communication device 200a, 200b, 200c accordingly in step S110.

There could also be different conditions as to when the first peer communication device 200a, 200b, 200c is to forward the timestamped identity information and location information in step S112

According to an embodiment, when to forward the timestamped identity information and location information in step S112 is based on at least one of communication capability and current remaining power of the first peer communication device 200a, 200b, 200c. The communication capability could pertain to whether the first peer communication device 200a, 200b, 200c has network access or not. The communication capability could pertain to what type of network access the first peer communication device 200a, 200b, 200c has (such as cellular network access, or network access via a local network, such as based on the IEEE 802.11 standards (sometimes referred to as Wi-Fi), etc.). The communication capability could pertain to what type of cellular network access the first peer communication device 200a, 200b, 200c has (such as cellular network access supporting services in a 3G, 4G, or 5G telecommunications network).

As an illustrative example, when to forward the timestamped identity information and location information to the network node 300 might be performed according to values of a parameter S_exchange, where the parameter S_exchange is given as S_exchange=once, continuously (timer value), battery level, mode value, and/or location.

Once having forwarded the data to the network node 300 the first peer communication device 200a, 200b, 200c might obtain data about other peer communication devices 200a, 200b, 200c from the network node 300. Particularly, according to an embodiment the first peer communication device 200a, 200b, 200c is configured to perform (optional) step S114:

S114: The first peer communication device 200a, 200b, 200c obtains, from the network node 300 and upon having forwarded the timestamped identity information and location information to the network node 300, further timestamped identity information and location information of yet other peer communication devices 200a, 200b, 200c.

As will be further disclosed below, the network node 300 might request timestamped identity information and location information for a particular peer communication device 200a, 200b, 200c. Particularly, according to an embodiment the first peer communication device 200a, 200b, 200c is configured to perform (optional) step S116:

S116: The first peer communication device 200a, 200b, 200c obtains, from the network node 300, a request pertaining to a device identity of a particular peer communication device 200a, 200b, 200c.

Figure 3:
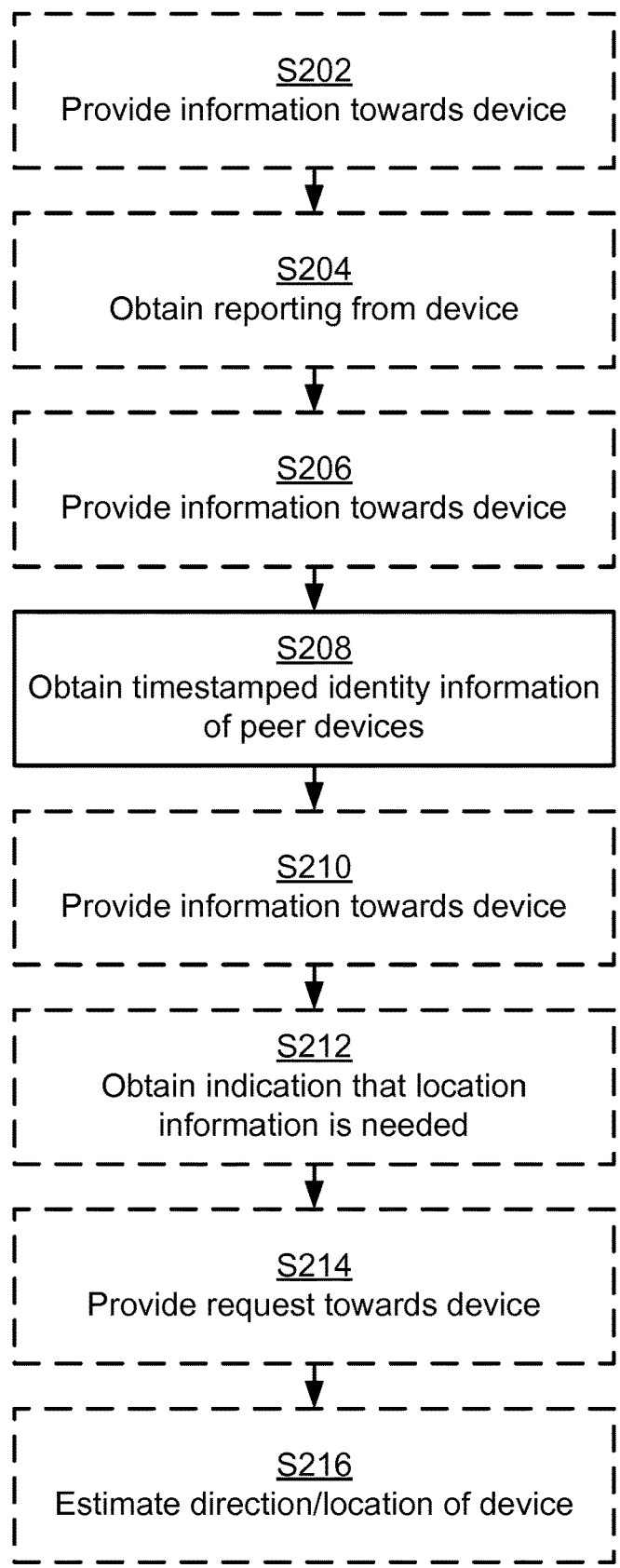

Reference is now made to FIG. 3 illustrating a method for obtaining information about peer communication devices 200a, 200b, 200c as performed by the network node 300 according to an embodiment.

As disclosed above, the first peer communication device 200a, 200b, 200c in step S112 forwards timestamped identity information and location information to the network node 300. It is assumed that the network node 300 receives this information. Particularly, the network node 300 is configured to perform step S208:

S208: The network node 300 obtains, from one of the peer communication devices 200a, 200b, 200c, timestamped identity information and location information about peer communication devices 200a, 200b, 200c of said one of the peer communication devices 200a, 200b, 200c.

Embodiments relating to further details of obtaining information about peer communication devices 200a, 200b, 200c as performed by the network node 300 will now be disclosed.

As disclosed above, in some embodiments the timestamped identity information and location information is represented by a set of data items, wherein each data item in the set of data items is provided with a timestamp and comprises location information as valid for the timestamp and a device identity of a respective peer communication device 200a, 200b, 200c.

As further disclosed above, in some embodiments each data item further comprises at least one of: current remaining power for each respective peer communication device 200a, 200b, 200c as valid for the timestamp, and sensor data collected by the respective peer communication device 200a, 200b, 200c.

As further disclosed above, in some embodiments each data item further comprises a mode value, wherein the mode vale takes a value in the set: normal mode, alert mode, emergency mode. For example, if the network node 300 obtains a timestamped identity information and location information of a particular peer communication device 200a, 200b, 200c with mode value set as alert mode or emergency mode, the network node 300 might forward information to other peer communication devices 200a, 200b, 200c within a certain distance from this particular peer communication devices 200a, 200b, 200c that the mode value is set as alert mode or emergency mode for this particular peer communication device 200a, 200b, 200c. For example, a particular peer communication device 200a, 200b, 200c might receive user input that triggers the mode value to be set as alert mode or emergency mode, for example if the user of the particular peer communication device 200a, 200b, 200c experiences an emergency situation or otherwise needs to trigger an alert. The mode value could trigger various actions depending on its value. For example, a mode value set to emergency mode or alert mode for a particular peer communication device 200a, 200b, 200c could trigger other particular peer communication devices 200a, 200b, 200c to scan for this particular peer communication device 200a, 200b, 200c (for example when in vicinity of the latest know location of this particular peer communication device 200a, 200b, 200c). For example, a mode value set to emergency mode or alert mode for a particular peer communication device 200a, 200b, 200c could trigger timestamped identity information and location information of this peer communication device 200a, 200b, 200c to be exchanged more often such that delivery of the trigger timestamped identity information and location information of this peer communication device 200a, 200b, 200c to the network node 300 is prioritized. For example, the mode value could act as a flag, and thus take value binary 0 or binary 1 depending on whether the flag is set or not. Hence, if the mode value could either set to normal mode or emergency/alert mode, the flag not being set could indicate normal mode, whereas the flag being set could indicate emergency/alert mode. If there are separate for emergency mode and alert mode, a further bit would be need in order to distinguish between these three mode values, and so on if even further mode values are to be used.

As further disclosed above, in some embodiments the timestamped identity information and location information obtained by the network node 300 is tagged with an identifier of said one of the peer communication devices 200a, 200b, 200c. The network node 300 is thereby enabled to track which timestamped identity information and location information is obtained from each peer communication devices 200a, 200b, 200c. If detected that the timestamped identity information and location information as obtained from a particular peer communication device 200a, 200b, 200c is incorrect, has been tampered with, or originates from a peer communication device with fraudulent behaviour, the network node 300 is then able to efficiently identify and possibly remove this timestamped identity information and location information. One way for the network node 300 to implement such a detection could be to compare the timestamped identity information and location information as obtained from this particular peer communication device 200a, 200b, 200c to timestamped identity information and location information as obtained from other peer communication devices 200a, 200b, 200c, thereby discovering inconsistencies. One way for the network node 300 to implement such a detection could be for the network node 300 to receive auxiliary information that either explicitly or implicitly identifies this particular peer communication device 200a, 200b, 200c as fraudulent. Such auxiliary information could be issued in case this particular peer communication device 200a, 200b, 200c has been stolen, etc.

As further disclosed above, in some embodiments at least some of the timestamped identity information and location information as obtained from one of the peer communication devices 200a, 200b, 200c have by this one of the peer communication devices 200a, 200b, 200c been exchanged with one other of the peer communication devices 200a, 200b, 200c over a device-to-device connection 160a, 160b to this one other of the peer communication devices 200a, 200b, 200c. The network node 300 might then inform this one of the peer communication devices about establishment of the device-to-device connection 160a, 160b. Particularly, according to an embodiment the network node 300 is configured to perform (optional) step S202:

S202: The network node 300 provides, towards this one of the peer communication devices 200a, 200b, 200c, information pertaining to at least one of when, how often, and at what location, this one of the peer communication devices 200a, 200b, 200c is to enable establishment of the device-to-device connection 160a, 160b.

There could be different ways for the network node 300 to obtain the timestamped identity information and location information from the peer communication device 200a, 200b, 200c as in step S208.

As disclosed above, the network node 300 might provide information regarding data that has already been obtained by the network node 300 from other peer communication devices 200a, 200b, 200c. Particularly, according to an embodiment the network node 300 is configured to perform (optional) step S206:

S206: The network node 300 provides information towards this one of the peer communication devices 200a, 200b, 200c. The information pertains to a set of device identities and respective timestamps already obtained by the network node 300.

As disclosed above, the peer communication devices 200a, 200b, 200c might select what data to forward to the network node 300. That is, according to an embodiment only those data items comprising the device identities in the set of device identities and timestamps newer that the respective timestamps are obtained from this one of the peer communication devices 200a, 200b, 200c (i.e., from the peer communication device 200a, 200b, 200c that the network node 300 obtained timestamped identity information and location information in step S208).

As further disclosed above, in some aspects the peer communication device 200a, 200b, 200c first provides only the device identities and respective timestamps to the network node 300. Particularly, according to an embodiment the network node 300 is configured to perform (optional) step S204:

S204: The network node 300 obtains reporting, from this one of the peer communication devices 200a, 200b, 200c (i.e., from the peer communication device 200a, 200b, 200c that the network node 300 obtained timestamped identity information and location information in step S208) and prior to providing this information towards this one of the peer communication devices 200a, 200b, 200c, of device identity and newest timestamp for each respective peer communication device 200a, 200b, 200c.

As further disclosed above, in some aspects the peer communication device 200a, 200b, 200c obtains data about other peer communication devices 200a, 200b, 200c from the network node 300. Particularly, according to an embodiment the network node 300 is configured to perform (optional) step S210:

S210: The network node 300 provides, towards this one of the peer communication devices 200a, 200b, 200c (i.e., towards the peer communication device 200a, 200b, 200c that the network node 300 obtained timestamped identity information and location information in step S208) and upon having obtained the timestamped identity information and location information from this one of the peer communication devices 200a, 200b, 200c in step S208, further timestamped identity information and location information of other peer communication devices 200a, 200b, 200c.

The peer communication devices 200a, 200b, 200c might thereby be provided with updated timestamped identity information and location information about peer communication devices 200a, 200b, 200c from the network node 300. In turn, this could enable the peer communication devices 200a, 200b, 200c to determine which timestamped identity information and location information the network node 300 has already received.

In some aspects, based on all timestamped identity information and location information the network node 300 has received the network node 300 determines for which peer communication devices 200a, 200b, 200c timestamped identity information and location information has not yet been received, or for which peer communication devices 200a, 200b, 200c the received timestamped identity information and location information is deemed too old. That is, the network node 300 might capture history data from peer communication devices 200a, 200b, 200c and may use this history data to determine potential lost or missing peer communication devices 200a, 200b, 200c and alert other peer communication devices 200a, 200b, 200c to prioritize requests relating to, and exchange of, timestamped identity information and location information for such potential lost or missing peer communication devices 200a, 200b, 200c. The network node 300 might thus request timestamped identity information and location information for such peer communication devices 200a, 200b, 200c. Particularly, according to an embodiment the network node 300 is configured to perform (optional) steps S212 and S214:

S212: The network node 300 obtains an indication that location information of a particular peer communication device 200a, 200b, 200c is needed.

S214: The network node 300 provides, towards this one of the peer communication devices 200a, 200b, 200c, a request pertaining to a device identity of this particular peer communication device 200a, 200b, 200c.

In some aspects the network node 300 uses data received for a particular peer communication devices 200a, 200b, 200c to estimate the direction towards and/or location of this particular peer communication devices 200a, 200b, 200c. Particularly, according to an embodiment the network node 300 is configured to perform (optional) step S216:

S216: The network node 300 estimates at least one of direction towards, and location of, one of the respective peer communication devices 200a, 200b, 200c based on the obtained timestamped identity information and location information of this one of the respective peer communication devices 200a, 200b, 200c and previously obtained timestamped identity information and location information of this one of the respective peer communication devices 200a, 200b, 200c.

Figure 4:
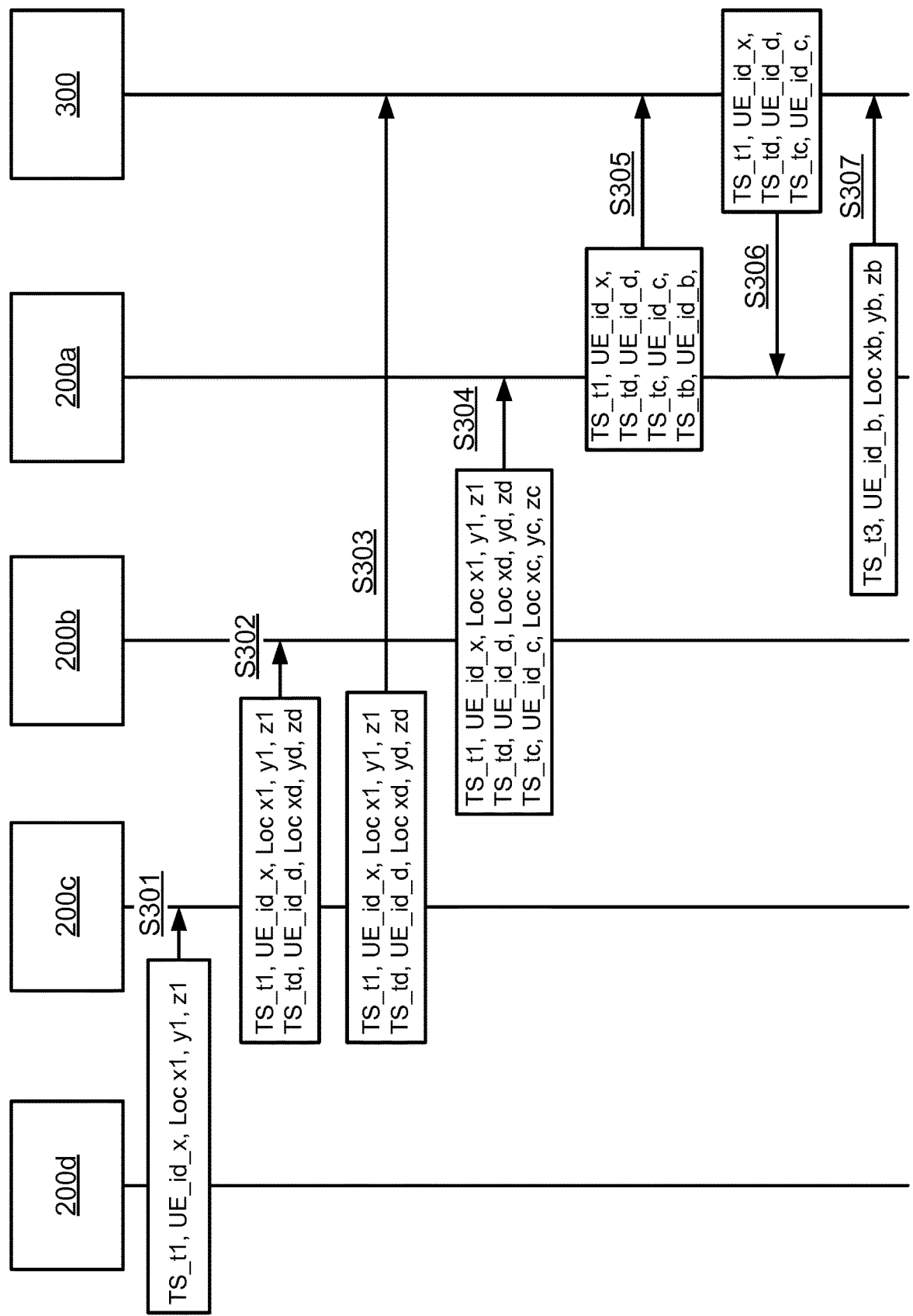
FIG. 4 is a signalling diagram according to an embodiment.

One particular embodiment based on at least some of the above disclosed embodiments will now be disclosed in detail with reference to the signalling diagram of FIG. 4.

S301: Peer communication device good has previously encountered a peer communication device with identity information UE_id_x in the form TS_t1, UE_id_x, with location information in the form Loc x1, y1, z1. Upon peer communication device good encountering peer communication device 200c, peer communication device 200c obtains this timestamped identity information and location information from peer communication device 200d and adds thereto timestamped identity information and location information about peer communication device 200d as TS_td, UE_id_d, Loc xd, yd, zd. Peer communication device 200c thus has timestamped identity information and location information as TS_t1, UE_id_x, Loc x1, y1, z1, and TS_td, UE_id_d, Loc xd, yd, zd, TS_td. Peer communication device 200d also obtains timestamped identity information and location information from peer communication device 200c, including timestamped identity information and location information of peer communication device 200c itself. However, it is noted that, for simplification and for illustrative purposes, in FIG. 4 only the timestamped identity information and location information as provided from peer communication device 200d to peer communication device 200c is shown in step S301.

S302: Peer communication device 200c encounters peer communication device 200b and these two peer communication devices exchange timestamped identity information and location information. Peer communication device 200b then has timestamped identity information and location information as TS_t1, UE_id_x, Loc x1, y1, z1, and TS_td, UE_id_d, Loc xd, yd, zd, TS_td, and TS_tc, UE_id_c, Loc xc, yc, zc. Peer communication device 200c also obtains timestamped identity information and location information from peer communication device 200b, including timestamped identity information and location information of peer communication device 200b itself. However, it is noted that, for simplification and for illustrative purposes, in FIG. 4 only the timestamped identity information and location information as provided from peer communication device 200c to peer communication device 200b is shown in step S302.

S303: Peer communication device 200c has network access and forwards its thus far collected timestamped identity information and location information (TS_t1, UE_id_x, Loc x1, y1, z1, and TS_td, UE_id_d, Loc xd, yd, zd, TS_td, and TS_tc, UE_id_c, Loc xc, yc, zc) to the network node 300. The network node 300 thereby also obtains timestamped identity information about peer communication device 200c itself.

S304: Peer communication device 200b encounters peer communication device 200a and these two peer communication devices exchange timestamped identity information and location information. Peer communication device 200a then has timestamped identity information and location information as TS_t1, UE_id_x, Loc x1, y1, z1, and TS_td, UE_id_d, Loc xd, yd, zd, and TS_tc, UE_id_c, Loc xc, yc, zc, and TS_t3, UE_id_b, Loc xb, yb, zb. Peer communication device 200b also obtains timestamped identity information and location information from peer communication device 200a, including timestamped identity information and location information of peer communication device 200a itself. However, it is noted that, for simplification and for illustrative purposes, in FIG. 4 only the timestamped identity information and location information as provided from peer communication device 200b to peer communication device 200a is shown in step S304.

S305: Peer communication device 200a has network access and forwards the timestamped identity information (TS_t1, UE_id_x, and TS_td, UE_id_d, and TS_tc, UE_id_c, and TS_tb, UE_id_b), of its collected timestamped identity information and location information to the network node 300. The network node 300 thereby also obtains timestamped identity information about peer communication device 200a itself.

S306: The network node 300 responds to peer communication device 200a with the timestamped identity information it has already obtained (including the timestamped identity information about peer communication device 200c as directly obtained by the network node 300 itself in step S303).

S307: Peer communication device 200a responds with the missing timestamped identity information and location information by forwarding TS_t3, UE_id_b, Loc xb, yb, zb to the network node 300.

Figure 5:
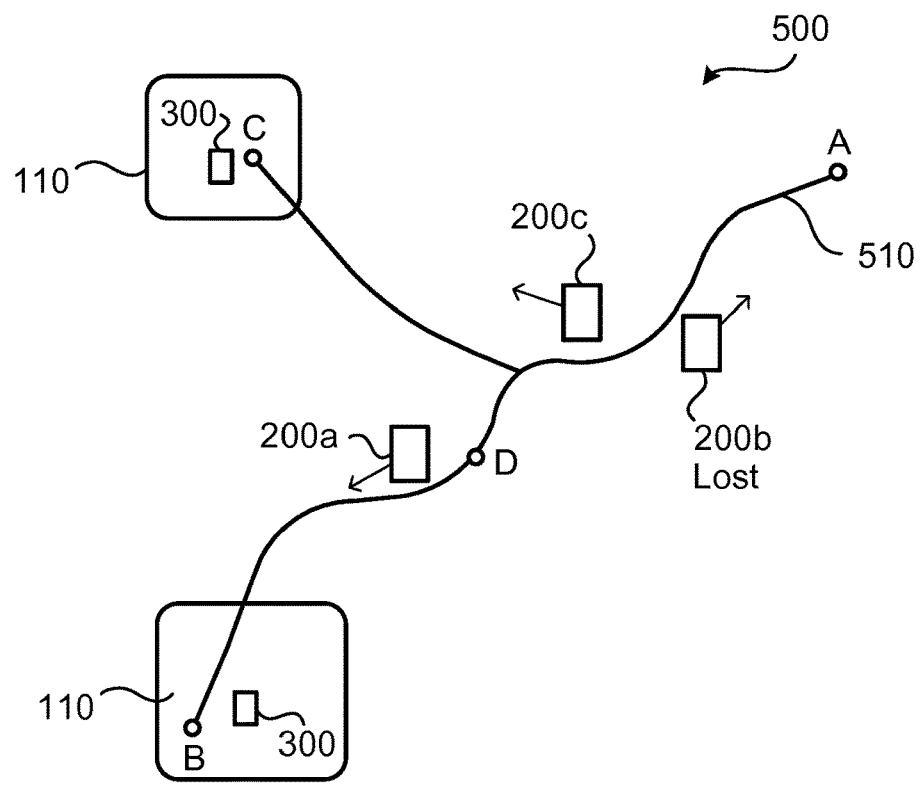
FIG. 5 is a schematic illustration of a scenario according to an embodiment.
Figure 6:
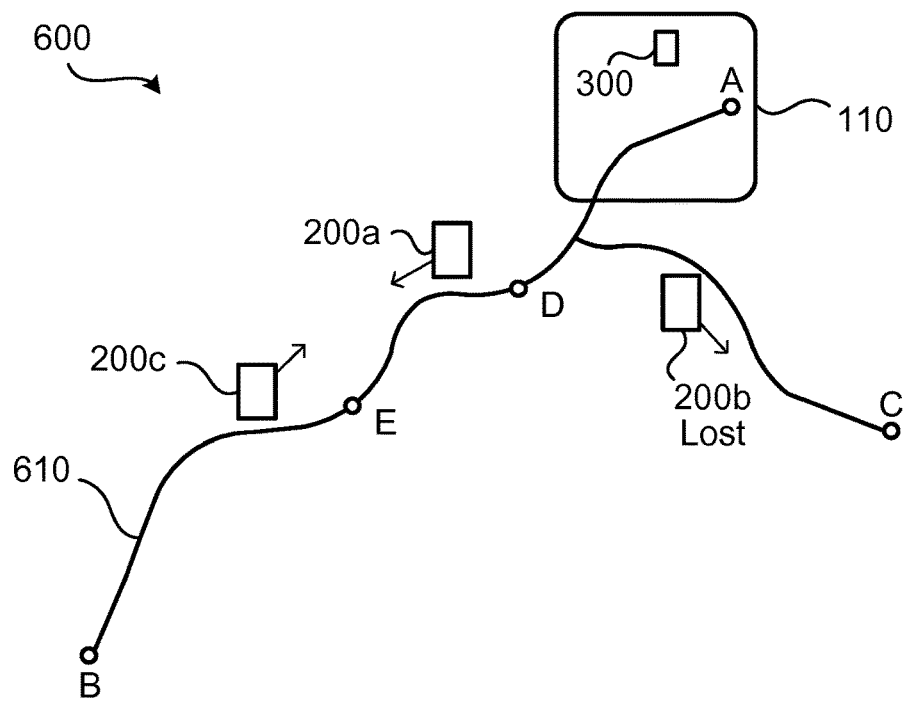
FIG. 6 is a schematic illustration of scenario according to an embodiment.

Reference is now given to FIGS. 5 and 6. These figures illustrate respective example scenarios. One such example scenarios could be that the peer communication devices 200a, 200b, 200c are carried by users that visit a national park, and upon entering the national park the users register the peer communication devices 200a, 200b, 200c to a service as defined by embodiments disclosed herein. Another such example scenarios could be that the peer communication devices 200a, 200b, 200c are carried by children, where the parents of the children have registered the peer communication devices 200a, 200b, 200c to a service as defined by embodiments disclosed herein. Another such example scenarios could be that the peer communication devices 200a, 200b, 200c are implemented as network equipped vehicles that are to travel in an area without network access and that upon entry of the area the network equipped vehicles use a service as defined by embodiments disclosed herein.

FIG. 5 illustrates an example scenario 500 where three peer communication devices 200a, 200b, 200c move along paths 510 in a geographical area. It is assumed that peer communication device 200b represents a communication device that eventually will be lost. Peer communication device 200a moves from point A towards point B and encounters peer communication device 200b at point D and exchanges timestamped identity information and location information with peer communication device 200b as in step S104 and adds the timestamped identity information and location information of peer communication device 200b itself as in step S106. Peer communication device 200a then reports this timestamped identity information and location information to a network node 300 when reaching the lower radio access networks 110 at point B. Peer communication device 200c moves from point A towards point C and does not encounter peer communication device 200b so the timestamped identity information and location information of peer communication device 200b itself is not included when peer communication device 200c reports its observations to the network node 300 upon reaching the upper covered radio access networks 110. The network node 300 can then determine 1) that peer communication device 200b is moving along the path towards northeast, and 2) That peer communication device 200b was lost before peer communication device 200c passed.

FIG. 6 illustrates an example scenario 600 where three peer communication devices 200a, 200b, 200c move along a path 610 in a geographical area. It is assumed that peer communication device 200b represents a communication device that eventually will be lost. Peer communication device 200a moves from point A towards point B and encounters peer communication device 200b at point D and exchanges timestamped identity information and location information with peer communication device 200b, as moving from point B towards point C, as in step S104 and adds the timestamped identity information and location information of peer communication device 200b itself as in step S106. Peer communication device 200a exchanges the timestamped identity information and location information collected in steps S104, S106 when encountering peer communication device 200c, as moving from point B towards point A, at point E. Peer communication device 200c then reports this to the network node 300 when reaching the radio access network 110. The network node 300 can then determine that peer communication device 200b was last seen at point D and never reached the radio access network 110.

Figure 7:
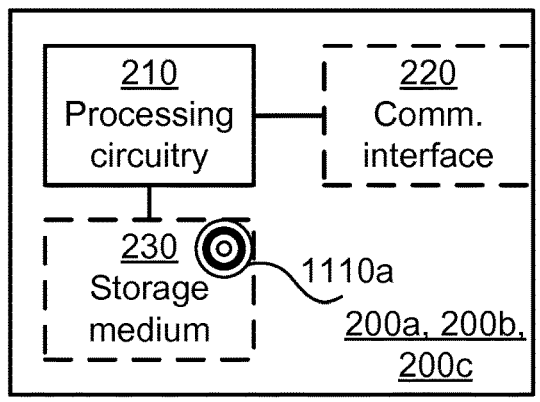
FIG. 7 is a schematic diagram showing functional units of a peer communication device according to an embodiment.

FIG. 7 schematically illustrates, in terms of a number of functional units, the components of a peer communication device 200a, 200b, 200c according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the peer communication device 200a, 200b, 200c to perform a set of operations, or steps, as disclosed above. For example, the storage medium 230 may store the set of operations, and the processing circuitry 210 may be configured to retrieve the set of operations from the storage medium 230 to cause the peer communication device 200a, 200b, 200c to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The peer communication device 200a, 200b, 200c may further comprise a communications interface 220 for communications with other peer communication devices 200a, 200b, 200c as well as network nodes 300, etc. As such the communications interface 220 may comprise one or more transmitters and receivers, comprising analogue and digital components.

The processing circuitry 210 controls the general operation of the peer communication device 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the peer communication device 200a, 200b, 200c are omitted in order not to obscure the concepts presented herein.

Figure 8:
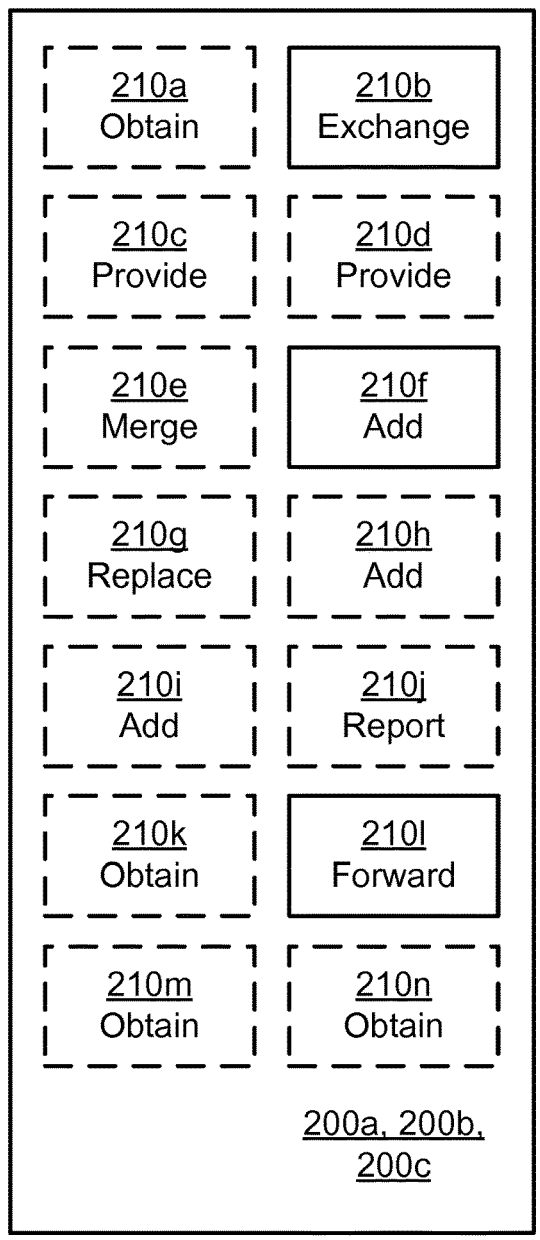
FIG. 8 is a schematic diagram showing functional modules of a peer communication device according to an embodiment.

FIG. 8 schematically illustrates, in terms of a number of functional modules, the components of a peer communication device 200a, 200b, 200c according to an embodiment. The peer communication device 200a, 200b, 200c of FIG. 8 comprises a number of functional modules; an exchange module 210b configured to perform step S104, an add module 210f configured to perform step S106, and a forward module 210l configured to perform step S112. The peer communication device 200a, 200b, 200c of FIG. 8 may further comprise a number of optional functional modules, such as any of an obtain module 210a configured to perform step S102, a provide module 210c configured to perform step S104a, a provide module 210C configured to perform step S104b, a merge module 210e configured to perform step S104c, a replace module 210g configured to perform step S104ca, an add module 210h configured to perform step S104cb, an add module 210l configured to perform step S104cc, a report module 210j configured to perform step S108, an obtain module 210k configured to perform step S110, an obtain module 210M configured to perform step S114, and an obtain module 210n configured to perform step S116.

In general terms, each functional module 210a-210n may be implemented in hardware or in software. Preferably, one or more or all functional modules 210a-210n may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210n and to execute these instructions, thereby performing any steps of the peer communication device 200a, 200b, 200c as disclosed herein.

Figure 9:
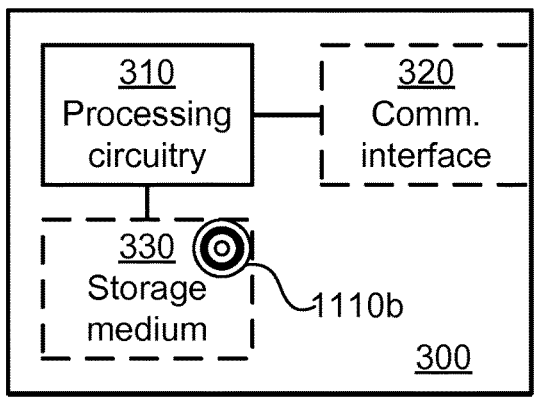
FIG. 9 is a schematic diagram showing functional units of a network node according to an embodiment.

FIG. 9 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with peer communication devices 200a, 200b, 200c as well as other network nodes 300, etc. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 10:
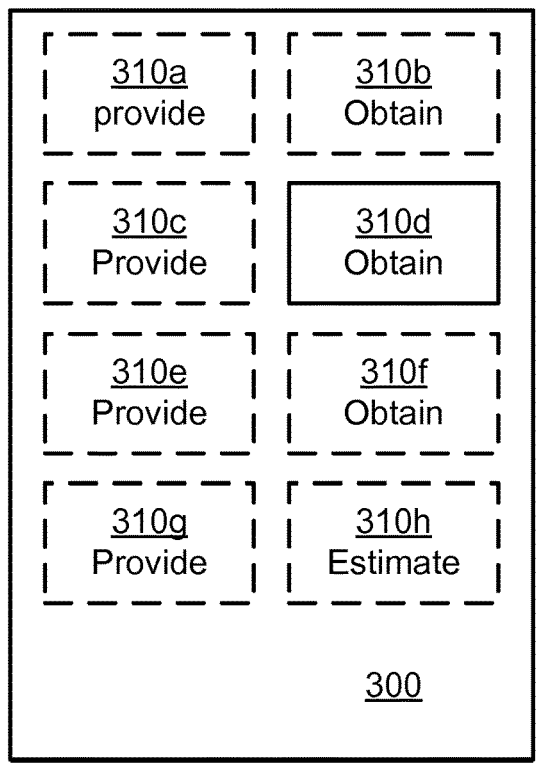
FIG. 10 is a schematic diagram showing functional modules of a network node according to an embodiment.

FIG. 10 schematically illustrates, in terms of a number of functional modules, the components of a network node 300 according to an embodiment. The network node 300 of FIG. 10 comprises an obtain module 310d configured to perform step S208. The network node 300 of FIG. 10 may further comprise a number of optional functional modules, such as any of a provide module 310a configured to perform step S202, an obtain module 310b configured to perform step S204, a provide module 310c configured to perform step S206, a provide module 310e configured to perform step S210, an obtain module 310f configured to perform step S212, a provide module 310g configured to perform step S214, an estimate module 310h configured to perform step S216.

In general terms, each functional module 310a-310h may be implemented in hardware or in software. Preferably, one or more or all functional modules 310a-310h may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310h and to execute these instructions, thereby performing any steps of the network node 300 as disclosed herein.

The network node 300 may be provided as a standalone device or as a part of at least one further device. For example, the network node 300 may be provided in a node of the radio access network or in a node of the core network. Alternatively, functionality of the network node 300 may be distributed between at least two devices, or nodes. These at least two nodes, or devices, may either be part of the same network part (such as the radio access network or the core network) or may be spread between at least two such network parts.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 9 the processing circuitry 310 may be distributed among a plurality of devices, or nodes. The same applies to the functional modules 310a-310h of FIG. 10 and the computer program 1120b of FIG. 11.

Figure 11:
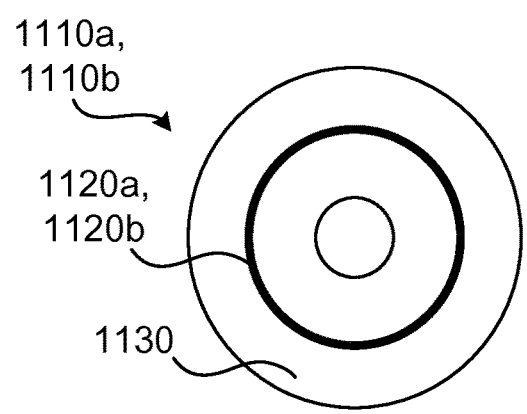
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the peer communication device 200a, 200b, 200c as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product mob may thus provide means for performing any steps of the network node 300 as herein disclosed.

In the example of FIG. 1i, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for providing information about peer communication devices to a network node, the method being performed by a first peer communication device, the method comprising:
determining to transmit, to a second peer communication device, timestamped first identity information and first location information associated with a third peer communication device based on data items stored on the second peer communication device;
transmitting, to the second peer communication device over a device-to-device connection, the timestamped first identity information and first location information associated with the third peer communication device, wherein the first identity information identifies the third peer communication device;
receiving, from the second peer communication device over the device-to-device connection, timestamped second identity information and second location information associated with the second peer communication device, wherein the second identity information identifies the second peer communication device; and
forwarding the timestamped first identity information, first location information, second identity information, and second location information to a network node upon network access to the network node.

2. The method according to claim 1, wherein the method comprises receiving, from the second peer communication device over the device-to-device connection, timestamped third identity information and third location information associated with a fourth peer communication device, wherein the third identity information identifies the fourth peer communication device.

3. The method according to claim 2, wherein the method comprises forwarding the timestamped third identity information and third location information to the network node upon network access to the network node.

4. The method according to claim 1, wherein prior to transmitting the timestamped first identity information and first location information to the second peer communication device, the first peer communication device includes a first initial set of data items and the second peer communication device includes a second initial set of data items.

5. The method according to claim 4, wherein
the first initial set of data items includes the first identity information and the first location information,
the second initial set of data items includes timestamped third identity information and third location information; and
determining to transmit, to the second peer communication device, the timestamped first identity information and the first location information associated with the third peer communication device based on the data items stored on the second peer communication device comprises determining a timestamp associated with the first identity information and the first location information is newer than a timestamp associated with the third identity information and the third location information.

6. The method according to claim 4, wherein determining to transmit, to the second peer communication device, the timestamped first identity information and the first location information associated with the third peer communication device based on the data items stored on the second peer communication device comprises determining the second initial set of data items does not include information associated with the third peer communication device.

7. The method according to claim 4, wherein the method comprises adding the second identity information and the second location information to the first initial set of data items.

8. The method according to claim 7, wherein the second identity information and the second location information are added to the first initial set of data items as a result of the first initial set of data items not including information about the second peer communication device.

9. The method according to claim 7, wherein
the first initial set of data items includes initial information associated with the second peer communication device, and
the second identity information and the second location information are added to the first initial set of data items as a result of a timestamp associated with the second identity information and the second location information being newer and a timestamp associated with the initial information.

10. The method according to claim 7, wherein
the second initial set of data items includes a plurality of sets of identity information and location information including the second identity information and the second location information, the method comprises receiving, from the second peer communication device over the device-to-device connection, each set of identity information and location information of the plurality of sets; and
adding each set of identity information and location information to the first initial set of data items.

11. The method according to claim 1, further comprising:
obtaining information from the network node including timestamped third identity information and third location information associated with a fourth peer communication device.

12. The method according to claim 11, wherein the obtained information from the network node includes initial information associated with the second peer communication device, and
the first identity information and first location information are forwarded to the network node as a result of a timestamp associated with the first identity information and the first location information being newer than a timestamp associated with the obtained initial information.

13. The method according to claim 11, wherein the first identity information and the first location information are forwarded to the network node prior to obtaining information from the network node.

14. The method according to claim 1, wherein the method comprises:
receiving an indication to delete the first identity information and the first location information.

15. The method according to claim 1, wherein determining to transmit, to the second peer communication device, the timestamped first identity information and the first location information associated with the third peer communication device is further based on determining that the first peer communication device is without network access to any network node.

16. The method according to claim 1, wherein when to forward the timestamped first identity information, first location information, second identity information, and second location information to the network node is based on at least one of communication capability and current remaining power of the first peer communication device.

17. The method according to claim 1, wherein the method comprises receiving, from the second peer communication device over the device-to-device connection, at least one of: current remaining power for the second peer communication device as valid for a timestamp associated with the second identity information and the second location information, and sensor data collected by the second peer communication device.

18. The method according to claim 1, wherein the method further comprises receiving, from the second peer communication device over the device-to-device connection, a mode value, wherein the mode-value indicates a present mode of the second peer communication device as valid for a timestamp associated with the second identity information and the second location information.

19. The method according to claim 1, wherein the timestamped first identity information and the first location information forwarded to the network node is tagged with an identifier of the first peer communication device.

20. The method according to claim 1, further comprising:
obtaining, from the network node and upon having forwarded the timestamped first identity information, first location information, second identity information, and second location information to the network node, further timestamped identity information and location information of other peer communication devices.

21. The method according to claim 1, further comprising:
obtaining, from the network node, a request pertaining to a device identity of a particular peer communication device.

22. The method according to claim 1, further comprising:
obtaining information pertaining to at least one of when, how often, and at what location, the first peer communication device is to enable establishment of the device-to-device connection.

23. The method according to claim 1, wherein the device-to-device connection is a wireless connection.

24. A peer communication device for providing information about peer communication devices to a network node, the peer communication device comprising processing circuitry, the processing circuitry being configured to cause the peer communication device to:
determine to transmit, to a second peer communication device, timestamped first identity information and first location information associated with a third peer communication device based on data items stored on the second peer communication device;
transmit, to the second peer communication device over a device-to-device connection, the timestamped first identity information and first location information associated with the third peer communication device, wherein the first identity information identifies the third peer communication device;
receive, from the second peer communication device over the device-to-device connection, timestamped second identity information and second location information associated with the second peer communication device, wherein the second identity information identifies the second peer communication device; and
forward the timestamped first identity information, first location information, second identity information, and second location information to a network node upon network access to the network node.

25. A peer communication device for providing information about peer communication devices to a network node, the peer communication device comprising:
a determining module configured to determine to transmit, to a second peer communication device, timestamped first identity information and first location information associated with a third peer communication device based on data items stored on the second peer communication device;
a transmitting module configured to transmit, to the second peer communication device over a device-to-device connection, the timestamped first identity information and first location information associated with the third peer communication device, wherein the first identity information identifies the third peer communication device;
a receiving module configured to receive, from the second peer communication device over the device-to-device connection, timestamped second identity information and second location information associated with the second peer communication device, wherein the second identity information identifies the second peer communication device; and a forwarding module configured to forward the timestamped first identity information, first location information, second identity information, and second location information to a network node upon network access to the network node.

26. A computer program product for providing information about peer communication devices to a network node, the computer program product comprising a non-transitory computer readable medium comprising computer code which, when run on processing circuitry of a peer communication device, causes the peer communication device to:
   determine to transmit, to a second peer communication device, timestamped first identity information and first location information associated with a third peer communication device based on data items stored on the second peer communication device;
   transmit, to the second peer communication device over a device-to-device connection, the timestamped first identity information and first location information associated with the third peer communication device, wherein the first identity information identifies the third peer communication device;
   receive, from the second peer communication device over the device-to-device connection, timestamped second identity information and second location information associated with the second peer communication device, wherein the second identity information identifies the second peer communication device; and
   forward the timestamped first identity information, first location information, second identity information, and second location information to a network node upon network access to the network node.

* * * * *